March 22, 1927. 1,621,635
C. KIRCH
SAFETY DEVICE AND BUMPER
Filed Oct. 22, 1925
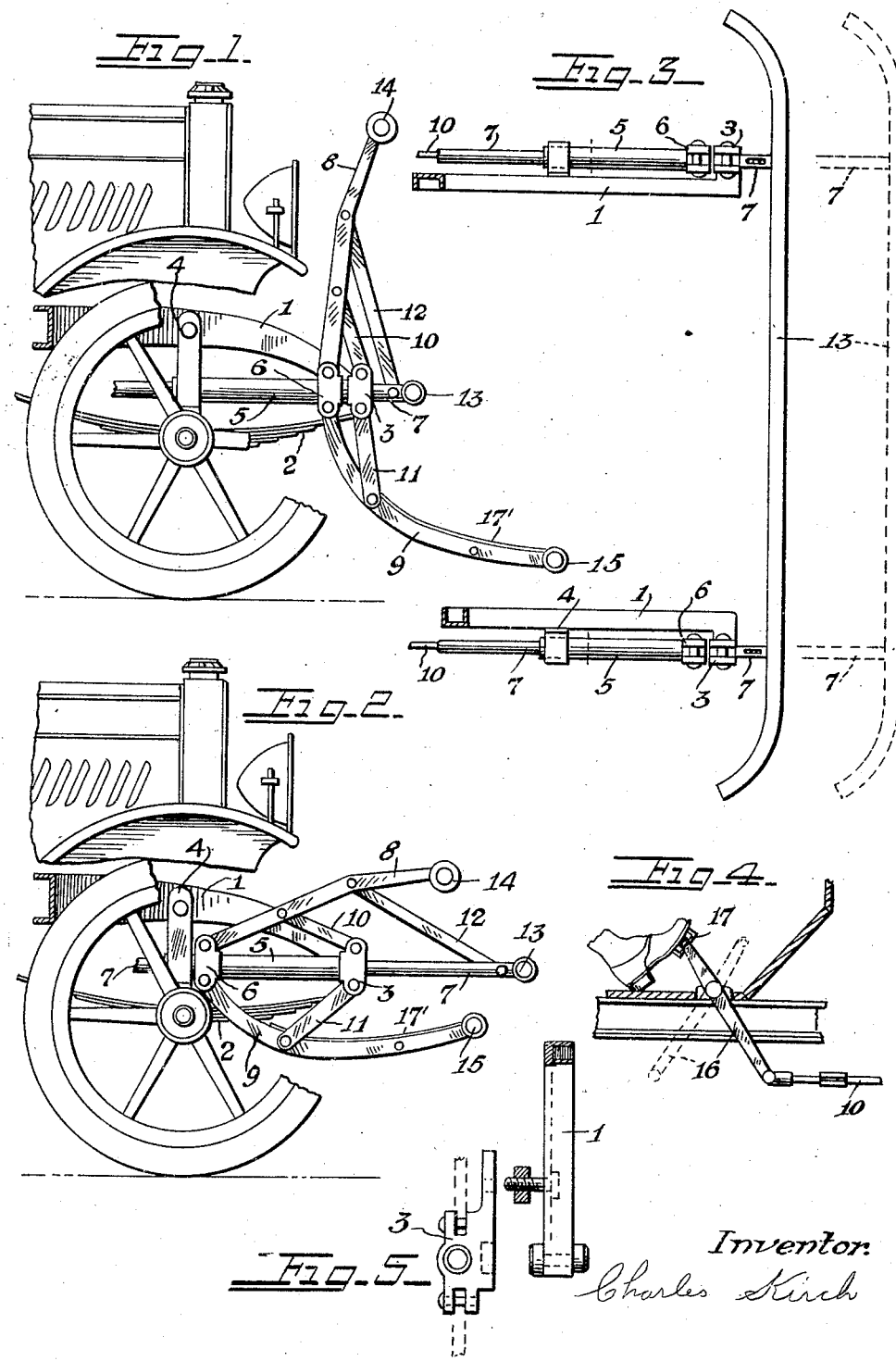
Inventor
Charles Kirch Patented Mar. 22, 1927.

1,621,635

UNITED STATES PATENT OFFICE.

CHARLES KIRCH, OF PASADENA, CALIFORNIA.

SAFETY DEVICE AND BUMPER.

Application filed October 22, 1925. Serial No. 64,171.

This invention relates to vehicle safety devices and particularly to fenders or bumpers for protecting pedestrians from being crushed beneath wheels of automobiles.

An object of this invention is to provide a device of this character which will open automatically when coming in contact with an object and which is also provided with a pedal control by which the driver may or may not as desired open the device.

With the foregoing and other objects in view I have invented the device shown in the accompanying drawings in which, Fig. 1 is the side elevation showing fender open as in use.

Fig. 2 is a like view of Fig. 1 showing the fender folded as the normal position for travel.

Fig. 3 is a plan view of fragmentary portion.

Fig. 4 is a side elevation of the pedal control being partly in section.

Fig. 5 is a detail, with parts detached or separated. Like reference characters indicate like parts throughout the several views and in the specification in which there is provided a forward extension or a horn of the autoframe indicated by the numeral 1, which is supported by a spring tube. Mounted upon the horn 1, is a front bracket 3, and a rear bracket 4, bearing fixed slide sleeves 5, upon which the pivot bearing head moves the extremes of which motions are shown in Figures 1, and 2. Within each sleeve 5, slides a plunger 7, in parallel but opposite direction to that of the head 6.

Pivoted to the head 6, are guard arms 8, and 9, which connect to the bracket 3, by links 10, and 11. Guard arm 8, is also connected to the plunger 7, by link 12.

Bars 13, 14 and 15, connect the two sides and are covered with rubber or other substance suitable for cushioning effect when brought in contact with a pedestrian.

Suitably mounted adjacent the operator of the car is a lever 16, provided with a pedal 17, and connected by a rod 10, with the plunger 7, by which the device may be operated by the driver of the car.

In operation the fender in its normal position is folded as seen in Figure 2, with the plunger 7, and bearing bumper bar 13 distended to the forward position. When this bumper bar 13 is brought in contact with any object it is pressed backward opening the fender to the position shown in Figures 1 and 3, or it may be opened by the operator before contacting the pedestrian.

A platform of perforated sheet metal, indicated by a numeral 17, is attached to the guard 15, and serves in like manner as the bumper and there may be provided a similar pedestrian receiving guard at the upper part.

Having described my invention, that which I claim to be new and desire to procure by Letters Patent is:

1. In a buffer controlled fender a pair of sleeves, shafts slidable therein, arms pivoted to the sleeves and means for actuating said arms.

2. In a buffer controlled fender a pair of sleeves, shafts slidable therein, arms pivoted to the sleeves and means for actuating said arms, said means consisting of links connecting the arms and shafts.

3. In a buffer controlled fender a pair of sleeves, shafts slidable therein, arms pivoted to the sleeves and means for actuating said arms, said means consisting of links connecting the arms and shafts, and means for actuating said shafts.

4. In a buffer controlled fender a pair of sleeves, shafts slidable therein, arms pivoted to the sleeves and means for actuating said arms, said means consisting of links connecting the arms and shafts, and means for actuating said shafts, said means consisting of a buffer.

5. In combination in a fender, a sliding member carrying a buffer, a pair of arms carrying buffer members and connected with the sliding member by links the parts arranged whereby, upon impact of the first buffer member and the moving of the sliding member the other buffer members will form a fender.

6. In a buffer controlled fender a pair of sleeves, shafts slidable therein, arms pivoted to the sleeves, means for actuating said arms, said means consisting of links connecting the arms and shafts, and means for actuating said shafts, said means consisting of a buffer, connecting said shafts.

7. In a buffer controlled fender a pair of sleeves, shafts slidable therein, arms pivoted to the sleeves, means for actuating said arms, said means consisting of links, connecting the arms and shafts, and means for actuating said shafts, said means consisting of a buffer, connecting said shafts, and supported thereby.

8. In combination with a vehicle, a pair of spaced apart forwardly extending sleeves at the side of the vehicle, shafts sliding in the sleeves, the shafts inter-connected by the buffing member and secondary buffer members inter-connecting the sleeves and shafts and adapted to cooperate to move the secondary buffer members away from each other upon movement of the shafts.

9. In a buffer control arrangement a sleeve, a shaft slidable in the sleeve, a buffer arm pivotally mounted to the sleeve, and a link member inter-connecting the sleeve and arm.

10. In a fender structure a plurality of fender buffer elements, a sleeve and arm carrying an upper of the buffer elements, a second arm carrying a lower of the buffer elements, a shaft slidable in the sleeve, a link inter-connecting the shaft and upper arm, a member sliding over the sleeve and providing a pivot for the arms and link members inter-connecting the sleeve and arms.

In testimony whereof I affix my signature.

CHARLES KIRCH.